(12) United States Patent
Tsai

(10) Patent No.: US 8,006,809 B2
(45) Date of Patent: Aug. 30, 2011

(54) MECHANISM FOR QUICKLY ADJUSTING TIGHTNESS OF BRAKE CABLE IN CALIPER BRAKE OF BICYCLE

(75) Inventor: Szu-Fang Tsai, Changhua (TW)

(73) Assignee: Tektro Technology Corporation, Changhua (TW)

( * ) Notice: Subject to any disclaimer, the term of this patent is extended or adjusted under 35 U.S.C. 154(b) by 361 days.

(21) Appl. No.: 12/430,931

(22) Filed: Apr. 28, 2009

(65) Prior Publication Data

US 2010/0270111 A1    Oct. 28, 2010

(51) Int. Cl.
*B62L 1/06*    (2006.01)
(52) U.S. Cl. .................. 188/24.19; 188/2 D
(58) Field of Classification Search ........... 188/24.11, 188/24.12, 24.19, 24.21, 24.22, 2 D; 74/502.6; 254/250, 251, 256
See application file for complete search history.

(56) References Cited

U.S. PATENT DOCUMENTS

| | | | | |
|---|---|---|---|---|
| 3,628,635 A * | 12/1971 | Yoshigai | ........................... | 188/6 |
| 3,941,215 A * | 3/1976 | Schoch | ....................... | 188/24.19 |
| 4,591,026 A * | 5/1986 | Nagano | ........................ | 188/2 D |
| 4,718,521 A * | 1/1988 | Hosokawa | ................ | 188/24.19 |
| 6,298,951 B1 * | 10/2001 | Wu | ............................. | 188/24.12 |

* cited by examiner

*Primary Examiner* — Robert Siconolfi
*Assistant Examiner* — Vu Q Nguyen

(57) ABSTRACT

A caliper brake of bicycle includes a yoke at one end of a second arm, the yoke comprising two yoke arms having a hole, and a spring depressible detent at one end; and a mechanism comprising a manipulation member disposed between the yoke arms and comprising a C-shaped element including outer teeth and an inner protrusion, and a handle; a brake cable retaining member; a cylinder secured to the brake cable retaining member and comprising outer recesses and an eccentric tunnel. The protrusion is engaged with one recess. The cylindrical member is fitted in the tunnel. The detent is urged against one tooth. A brake cable is held tight. In response to counterclockwise rotating the handle the tunnel moves upward and both the detent moves to another tooth and the protrusion moves to another recess so as to loosen the brake cable.

7 Claims, 5 Drawing Sheets

MECHANISM FOR QUICKLY ADJUSTING TIGHTNESS OF BRAKE CABLE IN CALIPER BRAKE OF BICYCLE

BACKGROUND OF THE INVENTION

1. Field of Invention

The invention relates to bicycle brake systems and more particularly to a mechanism for quickly adjusting tightness of a brake cable (i.e., loosening the brake cable for a subsequent removal of tire) in a caliper brake of bicycle with improved characteristics.

2. Description of Related Art

A conventional caliper brake of bicycle is shown in FIG. 1. The caliper brake is implemented as a single pivot side-pull brake. In a normal condition, a brake cable 3 is held tight. It is seen that a distance between two opposite brake pads 13 and 14 is less than a width of a tire 4. The caliper brake comprises a brake cable loosening and tightening device 10 at one end of a second arm 120 which has a second brake pad 13 at the other end. The caliper brake further comprises a first arm 110 having a lower end provided with a first brake pad 14 opposite the second brake pad 13 and an upper end with a cable housing 11 provided thereat. Both arms 110, 120 cross at a pivot (not shown). A brake cable 3 passes the cable housing 11 to terminate at the brake cable loosening and tightening device 10. A fastener 2 has a nut 21 for fastening the brake cable 3 at the cable housing 11.

For removing the tire 4 for repair or replacement, a person may manipulate the brake cable loosening and tightening device 10 to loosen the brake cable 3. As such, both brake pads 13, 14 move laterally away from each other. The manipulation of the brake cable loosening and tightening device 10 can be stopped if the distance between the brake pads 13 and 14 is greater than the width of the tire 4. Thereafter, the person may easily remove the tire 4.

But this is unsatisfactory for the purpose for which the invention is concerned for the following reasons:

The brake cable loosening and tightening device 10 is exposed. Hence, it tends to loosen or damage due to contact with foreign objects. Further, its appearance is not aesthetic. Furthermore, its operation is not smooth or even uneasy. Thus, the need for improvement still exists.

SUMMARY OF THE INVENTION

It is therefore one object of the invention to provide a mechanism for quickly adjusting tightness of a brake cable in a caliper brake of bicycle.

The above and other objects, features and advantages of the invention will become apparent from the following detailed description taken with the accompanying drawings.

DETAILED DESCRIPTION OF THE INVENTION

Referring to FIGS. 2 to 5, a mechanism 60 for quickly adjusting tightness of a brake cable 92 in a caliper brake 1 of bicycle in accordance with a preferred embodiment of the invention is shown.

Figure 1:
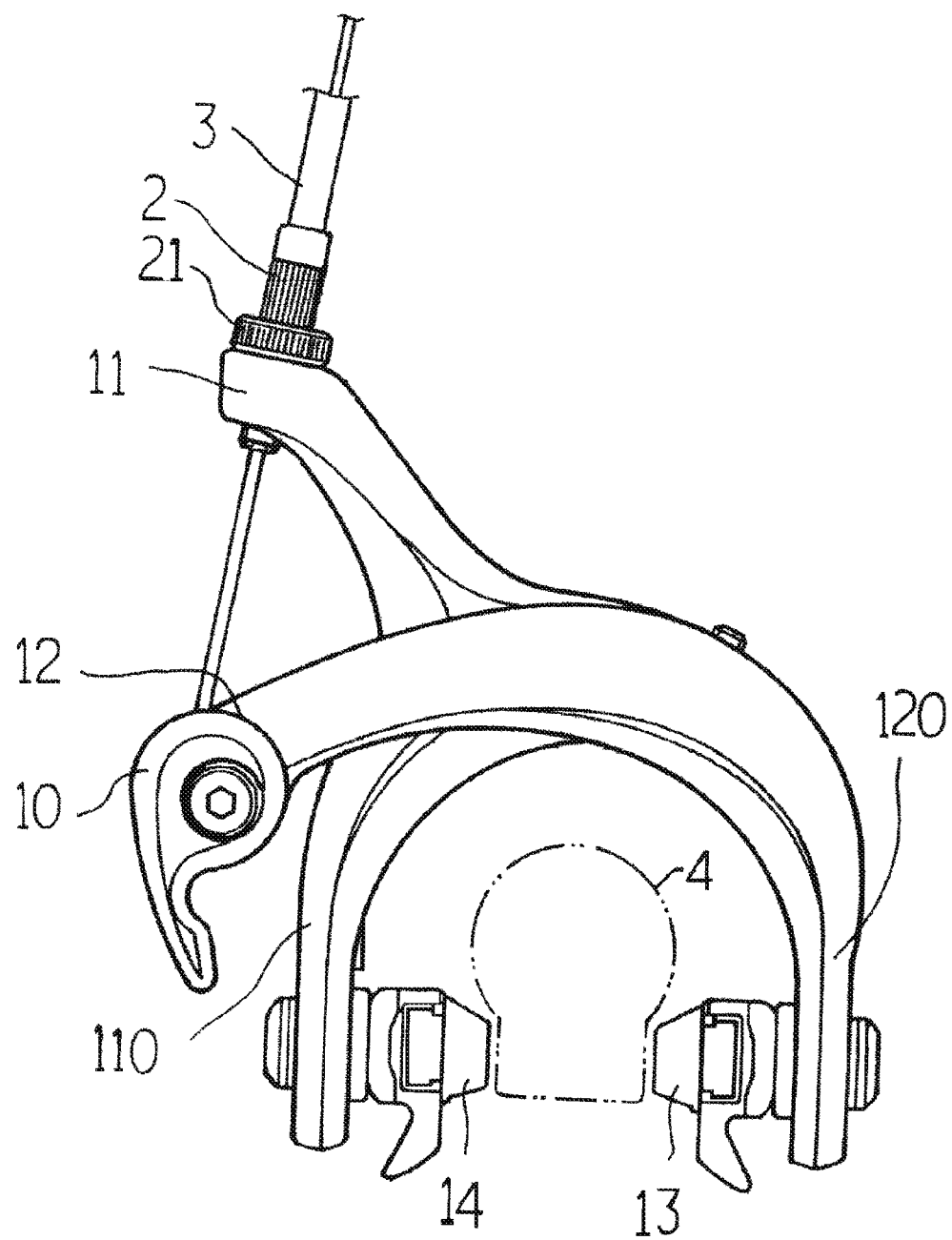
FIG. 1 is a schematic front view of a conventional caliper brake of bicycle.
Figure 2:
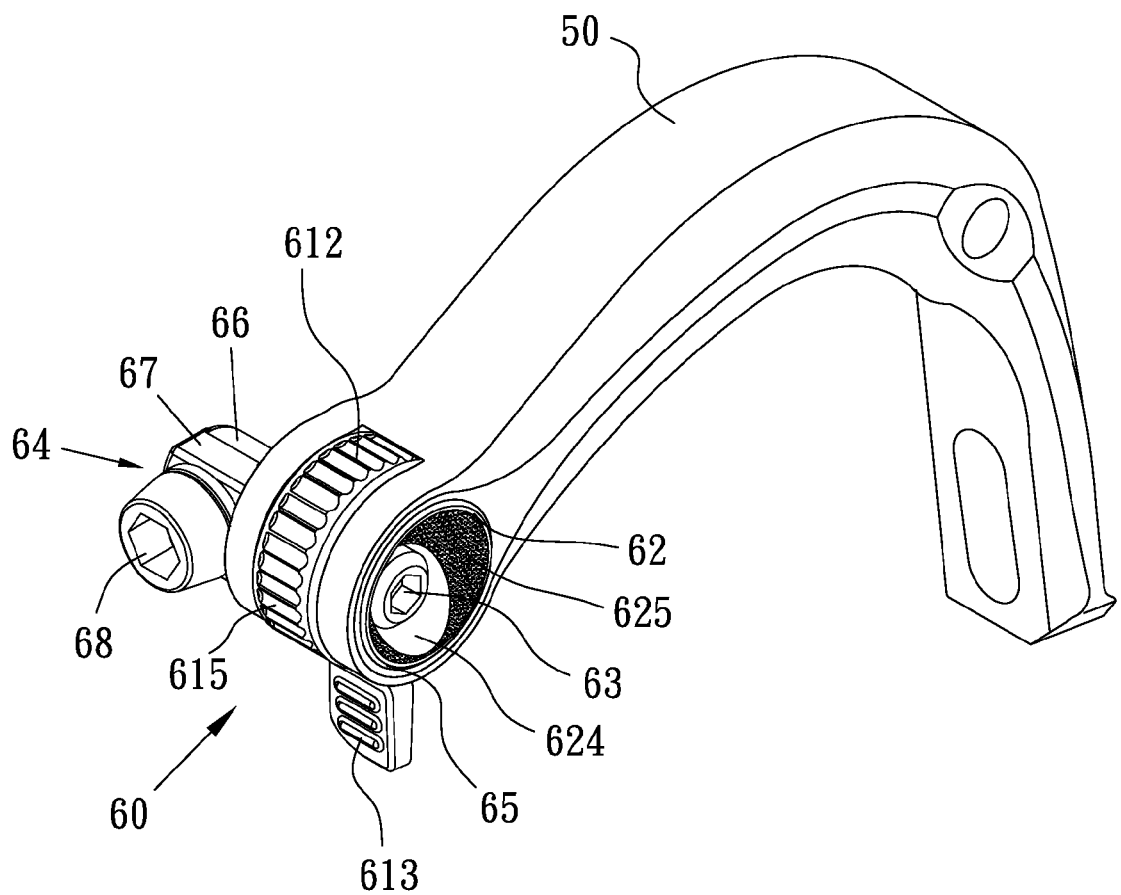
FIG. 2 is a perspective view of a first arm incorporating a preferred embodiment of mechanism for quickly adjusting tightness of a brake cable in a caliper brake of bicycle according to the invention.
Figure 3:
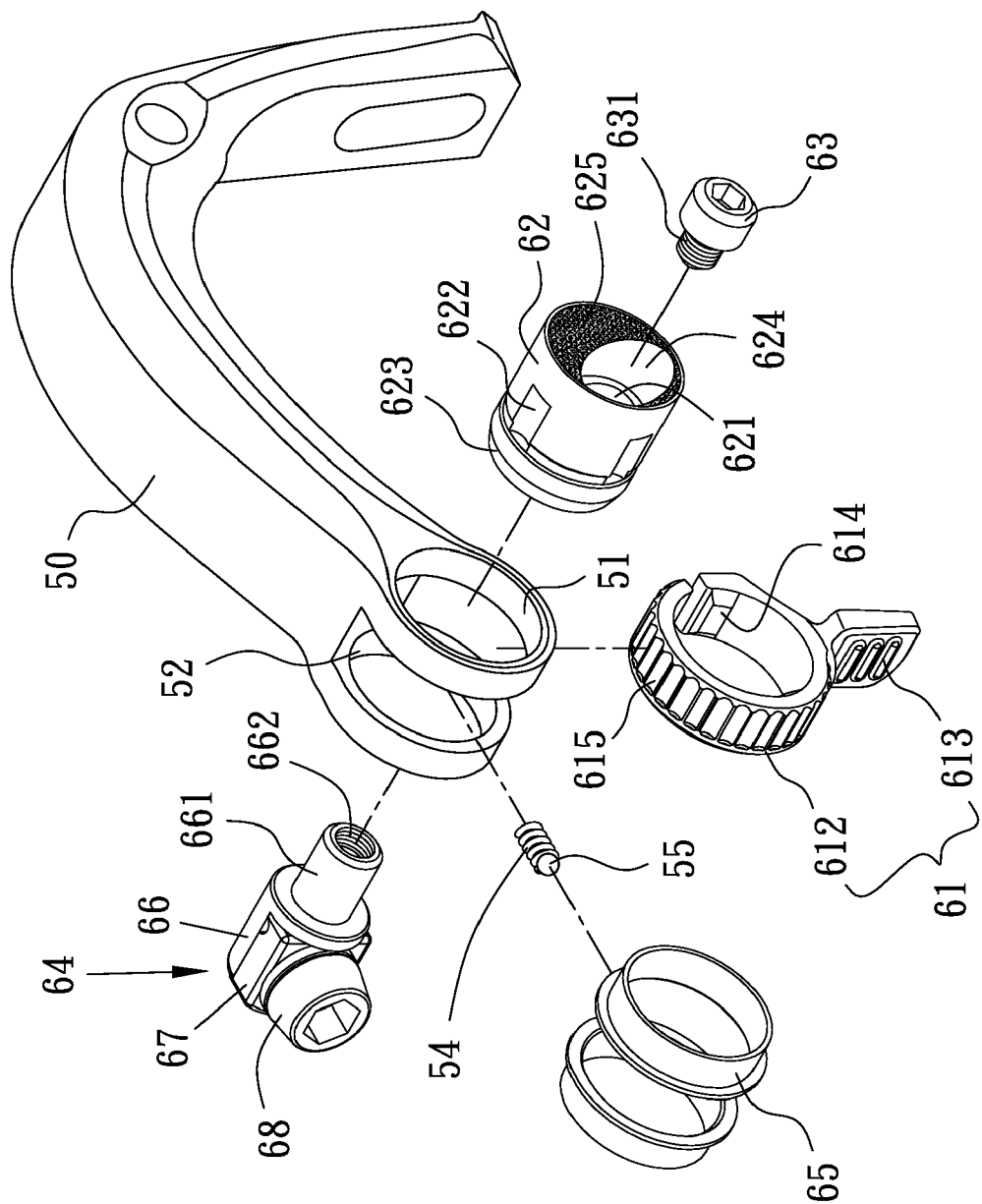
FIG. 3 is an exploded view of the mechanism of FIG. 2.
Figure 4:
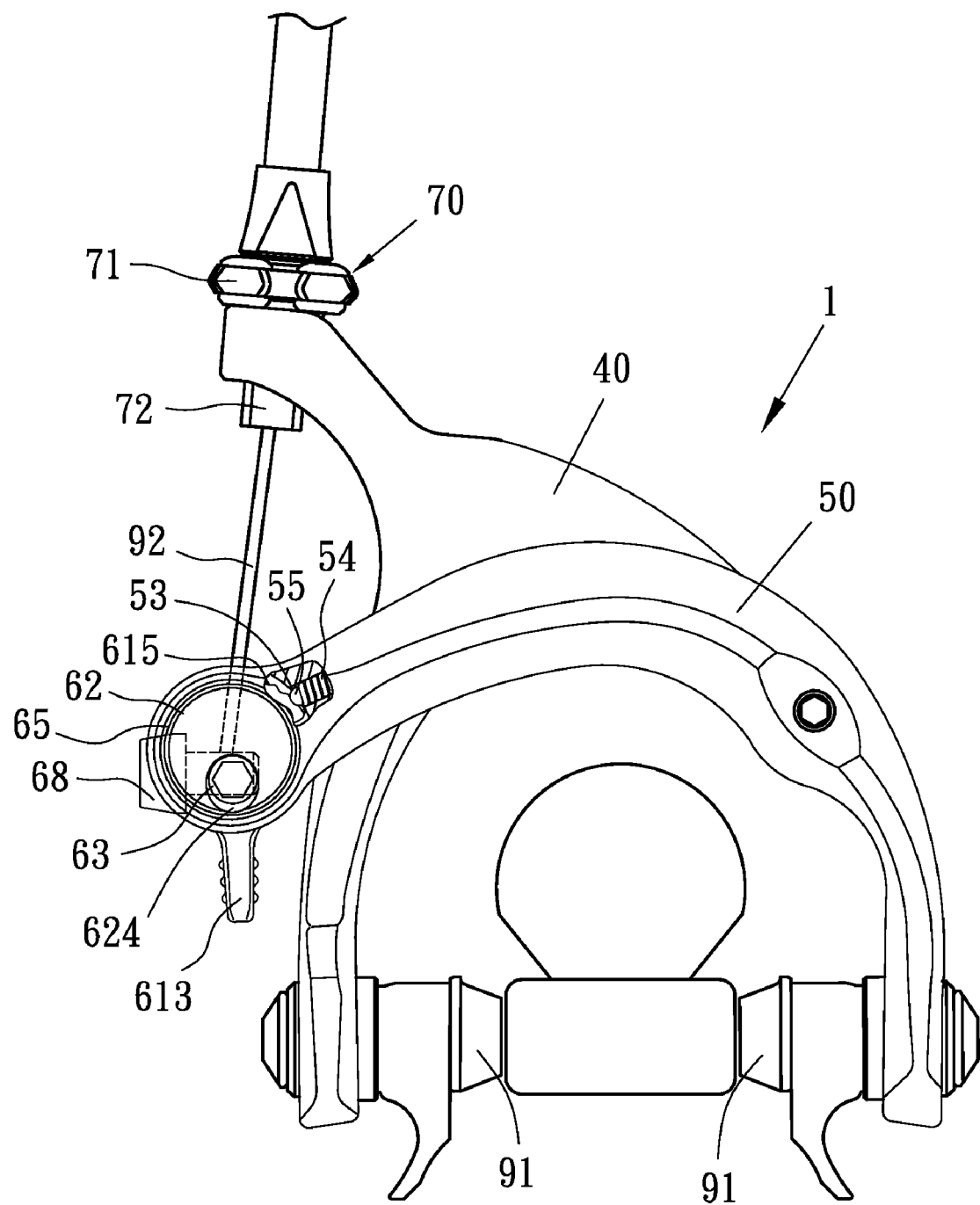
FIG. 4 is a schematic front view of a caliper brake of bicycle incorporating the mechanism of FIG. 2, where the mechanism is in a normal condition with the brake cable being held tight.
Figure 5:
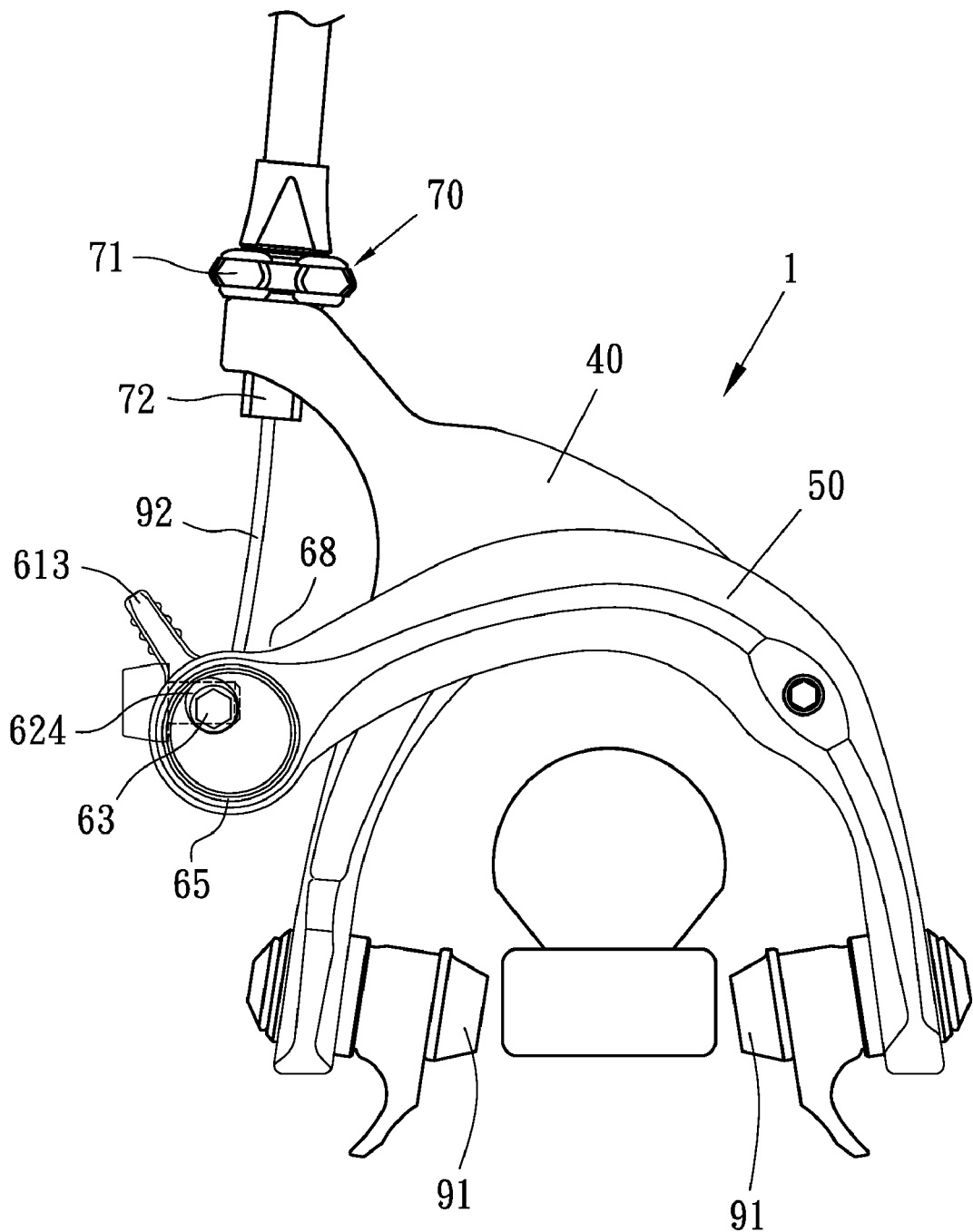
FIG. 5 is a view similar to FIG. 4 where the mechanism has been manipulated to loosen the brake cable prior to removing the tire.

The caliper brake 1 is implemented as a single pivot side-pull brake. The caliper brake 1 comprises the mechanism 60 provided at one end of a second arm 50 which has a second brake pad 91 at the other end. The caliper brake 1 further comprises a second arm 40 having a lower end provided with a first brake pad 91 opposite the second brake pad 91 and an upper end with a cable housing 70 provided thereat. Both arms 40, 50 cross at a pivot (not shown). A brake cable 92 passes an extending sleeve 72 of the cable housing 70 to terminate at the mechanism 60. A threaded fastener 71 is provided at the cable housing 70 to fasten the brake cable 92. In a normal condition, the brake cable 92 is held tight. In FIG. 4, it is seen that a distance between two opposite brake pads 91 is less than a width of a tire (not numbered). One end of the second arm 50 is shaped as a yoke including two hole-shaped yoke arms 51, a space 52 between the yoke arms 51, a short receptacle 53 between the yoke arms 51 open to the space 52, a helical spring 54 anchored in the receptacle 53, and a detent (e.g., steel ball) 55 provided at an outer end of the spring 54.

The mechanism 60 as the subject of the invention comprises a pair of rings 65 fitted in the holes of the yoke arms 51 respectively; a manipulation member 61 rotatably provided between the rings 65 and comprising a C-shaped member 612 having a series of teeth 615 formed on an outer surface and a protrusion 614 formed on an inner surface proximate one end of the C-shaped member 612, and a knurled handle 613 projecting out of the C-shaped member 612 to dispose between and externally of the yoke arms 51. The steel ball 55 is pushed by the spring 54 to lockingly urge against one of the teeth 615.

The mechanism 60 further comprises a brake cable retaining member 64 comprising a body 66, a clamping element 67 for retaining the brake cable 92 therein, a projecting member 68 having a hexagonal hole (not numbered), and a projecting cylindrical member 661 having internal threads 662; a cylinder 62 comprising a truncated cone 623 at one end for facilitating an insertion into the yoke arms 51 and the C-shaped member 612, a plurality of equally spaced positioning recesses 622 formed on an intermediate portion of an outer surface of the cylinder 62, an eccentric tunnel 621 through the cylinder 62, an obliquely truncated hole 624 in communication with the tunnel 621, the hole 624 having a diameter larger than that of the tunnel 621 and being open to the external, and a concave surface 625 having a color completely different from that of the second arm 50 and formed between the other end of the cylinder 62 and the hole 624; and a fastener 63 (e.g., bolt) having a threaded shank 631. The cylinder 62 is substantially disposed in the yoke arms 51 and the space 52 with the protrusion 614 lockingly engaged with one of the positioning recesses 622. The brake cable retaining member 64 projects out of one yoke arm 51 with its cylindrical member 661 fitted in the tunnel 621. Also, the threaded shank 631 is driven into the threads 662 to secure the cylinder 62 and the brake cable retaining member 64 together.

As shown in FIG. 4, the handle 613 is disposed below the rings 65. The steel ball 55 is pushed by the spring 54 to lockingly urge against one of the teeth 615 proximate the other end of the C-shaped member 612. The hole 624 is disposed at its lowest position in the cylinder 62. In this position, the brake cable 92 is held tight.

The mechanism 60 operates as follows. A person may hold and rotate the handle 613 counterclockwise about 135 degrees until the hole 624 is disposed at its highest position (see FIG. 5). Both the steel ball 55 moves from one of the teeth 615 proximate the other end of the C-shaped member 612 to one of the teeth 615 proximate the handle 613 and the protrusion 614 moves from one positioning recess 622 to another positioning recess 622 during the counterclockwise rotation of the handle 613. As a result, the brake cable 92 is loosened. Thereafter, the person may remove the tire for repair or replacement. For tightening the brake cable 92, the person may traverse the steps discussed with reference to FIGS. 4 to 5 in the opposite direction.

While the invention herein disclosed has been described by means of specific embodiments, numerous modifications and variations could be made thereto by those skilled in the art without departing from the scope and spirit of the invention set forth in the claims.

What is claimed is:

1. A caliper brake of a bicycle comprising:
   a first arm;
   a cable housing disposed at an upper end of the first arm;
   a first brake pad affixed to a lower end of the first arm;
   a second arm pivotably secured to the first arm and comprising a yoke at one end, the yoke comprising two opposite yoke arms having a hole, and a spring depressible detent disposed at one end of the second arm and between the yoke arms;
   a second brake pad affixed to the other end of the second arm; and
   a mechanism comprising a manipulation member rotatably disposed between the yoke arms, the manipulation member comprising a C-shaped element including a plurality of teeth formed on an outer surface thereof, and a protrusion formed on an inner surface proximate one end of the C-shaped element, and a handle projecting out of the C-shaped element to dispose between and externally of the yoke arms; a brake cable retaining member for retaining a brake cable passing the cable housing and comprising a projecting cylindrical member having internal threads; a cylinder comprising a plurality of spaced positioning recesses formed on an intermediate portion of an outer surface thereof, an eccentric tunnel through the cylinder, and a hole in communication with the tunnel, the hole having a diameter larger than that of the tunnel; and a fastener having a threaded shank,
   wherein the cylinder is substantially disposed in the yoke, the protrusion is lockingly engaged with one of the positioning recesses, the cylindrical member is fitted in the tunnel, the threaded shank is driven into the threads to secure the cylinder and the brake cable retaining member together, the handle is disposed below the yoke, the detent is urged against one of the teeth proximate the other end of the C-shaped element, the hole is disposed at its lowest position in the yoke, and the brake cable is held tight; and
   wherein in response to counterclockwise rotating the handle the hole disposes at a position higher than its lowest position in the yoke and both the detent moves to another one of the teeth and the protrusion moves to another one of the positioning recesses so as to loosen the brake cable.

2. The caliper brake of claim 1, wherein the handle is knurled.

3. The caliper brake of claim 1, wherein the cylinder further comprises a truncated cone at one end opposite the hole.

4. The caliper brake of claim 1, further comprising two rings each fastened between the C-shaped element and one of the yoke arms.

5. The caliper brake of claim 1, wherein the hole is obliquely truncated.

6. The caliper brake of claim 5, wherein the cylinder further comprises a concave surface formed between the other end thereof and the obliquely truncated hole.

7. The caliper brake of claim 6, wherein the concave surface has a color different from that of the second arm.

\* \* \* \* \*